United States Patent
Kang et al.

(10) Patent No.: US 8,201,695 B2
(45) Date of Patent: Jun. 19, 2012

(54) LIFT TYPE PORE-CONTROLLABLE FIBER FILTER

(75) Inventors: Young Bae Kang, Busan (KR); Gyu Tae Kim, Busan (KR)

(73) Assignee: SSENG Co., Ltd., Busan (KR)

( * ) Notice: Subject to any disclaimer, the term of this patent is extended or adjusted under 35 U.S.C. 154(b) by 182 days.

(21) Appl. No.: 12/747,823

(22) PCT Filed: Jul. 8, 2008

(86) PCT No.: PCT/KR2008/004008
§ 371 (c)(1),
(2), (4) Date: Aug. 10, 2010

(87) PCT Pub. No.: WO2009/075447
PCT Pub. Date: Jun. 18, 2009

(65) Prior Publication Data
US 2010/0314309 A1  Dec. 16, 2010

(30) Foreign Application Priority Data
Dec. 13, 2007  (KR) .................. 10-2007-0129743

(51) Int. Cl.
*B01D 33/052* (2006.01)

(52) U.S. Cl. ........ 210/350; 210/351; 210/408; 210/410; 210/411

(58) Field of Classification Search .................. 210/350, 210/351, 352, 407, 508, 409, 410, 411, 412
See application file for complete search history.

(56) References Cited

U.S. PATENT DOCUMENTS

| | | | |
|---|---|---|---|
| 4,019,984 A * | 4/1977 | Mohn | 210/770 |
| 5,164,079 A * | 11/1992 | Klein | 210/186 |
| 2008/0035536 A1 * | 2/2008 | Kang et al. | 210/86 |

FOREIGN PATENT DOCUMENTS

| | | |
|---|---|---|
| JP | 63-294911 A | 12/1988 |
| JP | 3-224621 A | 10/1991 |
| JP | 10-66807 A | 3/1998 |
| KR | 10-1997-7944 B1 | 5/1997 |
| KR | 10-2001-0035528 A | 5/2001 |
| KR | 10-0393274 B1 | 9/2003 |
| KR | 10-0438460 B1 | 7/2004 |

* cited by examiner

*Primary Examiner* — Fred Prince
(74) *Attorney, Agent, or Firm* — Birch, Stewart, Kolasch & Birch, LLP

(57) ABSTRACT

A lift type pore-controllable fiber filter includes a filter tank, a strainer coaxially formed as a porous tub in the filter tank, extending to an outside of the filter tank at a bottom thereof to communicate with a treated water drain pipe, and having a piston guide recessed in an axial direction at an upper portion thereof, a lifting driver including a cylinder and a piston, an upper filter material fixing plate having fixing means, fixed to the piston above the strainer, and working in collaboration with reciprocation of the piston, a lower filter material fixing plate having fixing means and fixed below the strainer, and at least one fiber filter material fixed to the fixing means of the upper and lower filter material fixing plates at upper and lower ends thereof respectively, and forming filtering pore layers on an outer circumference of the strainer.

8 Claims, 3 Drawing Sheets

[Fig. 1]
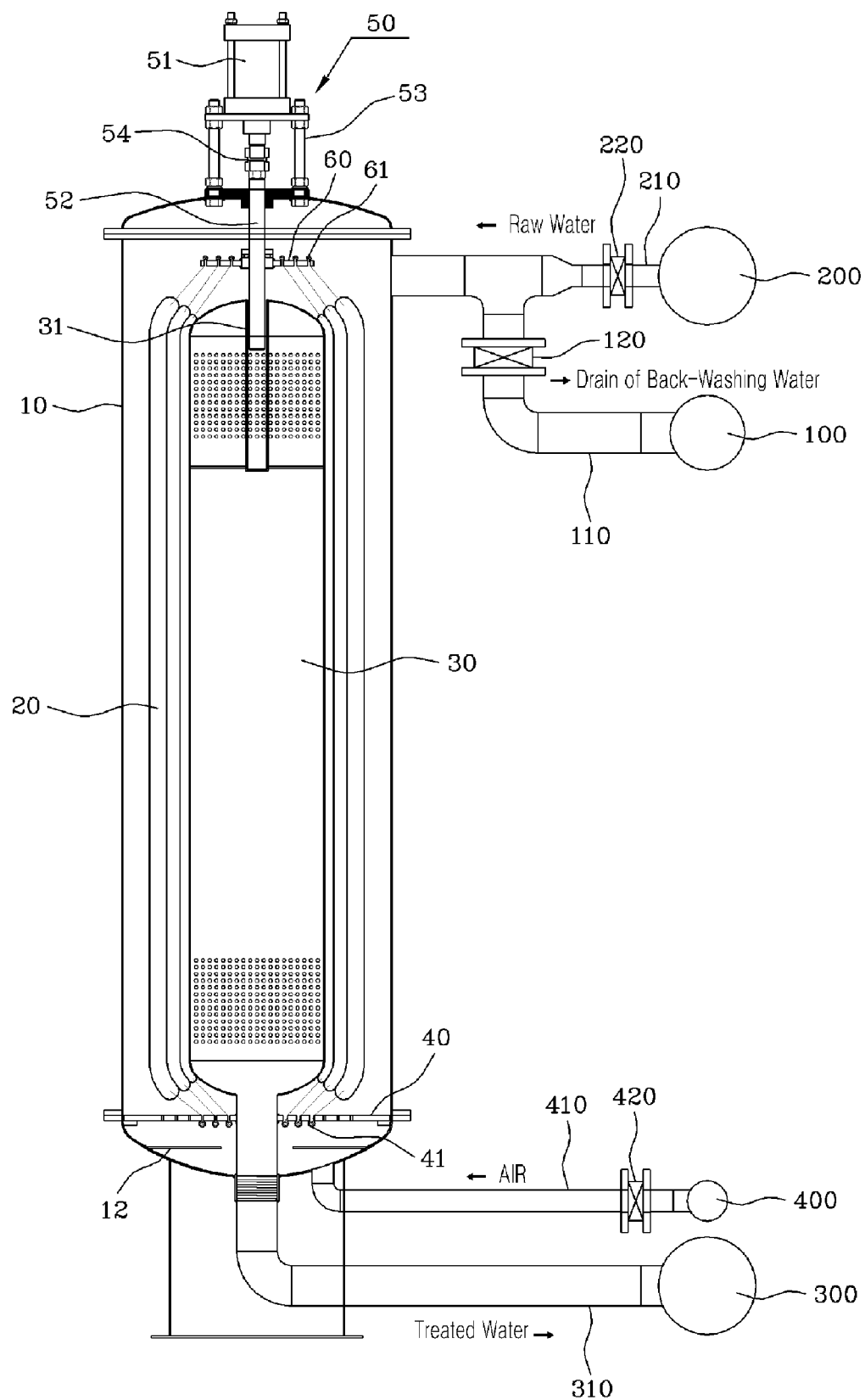

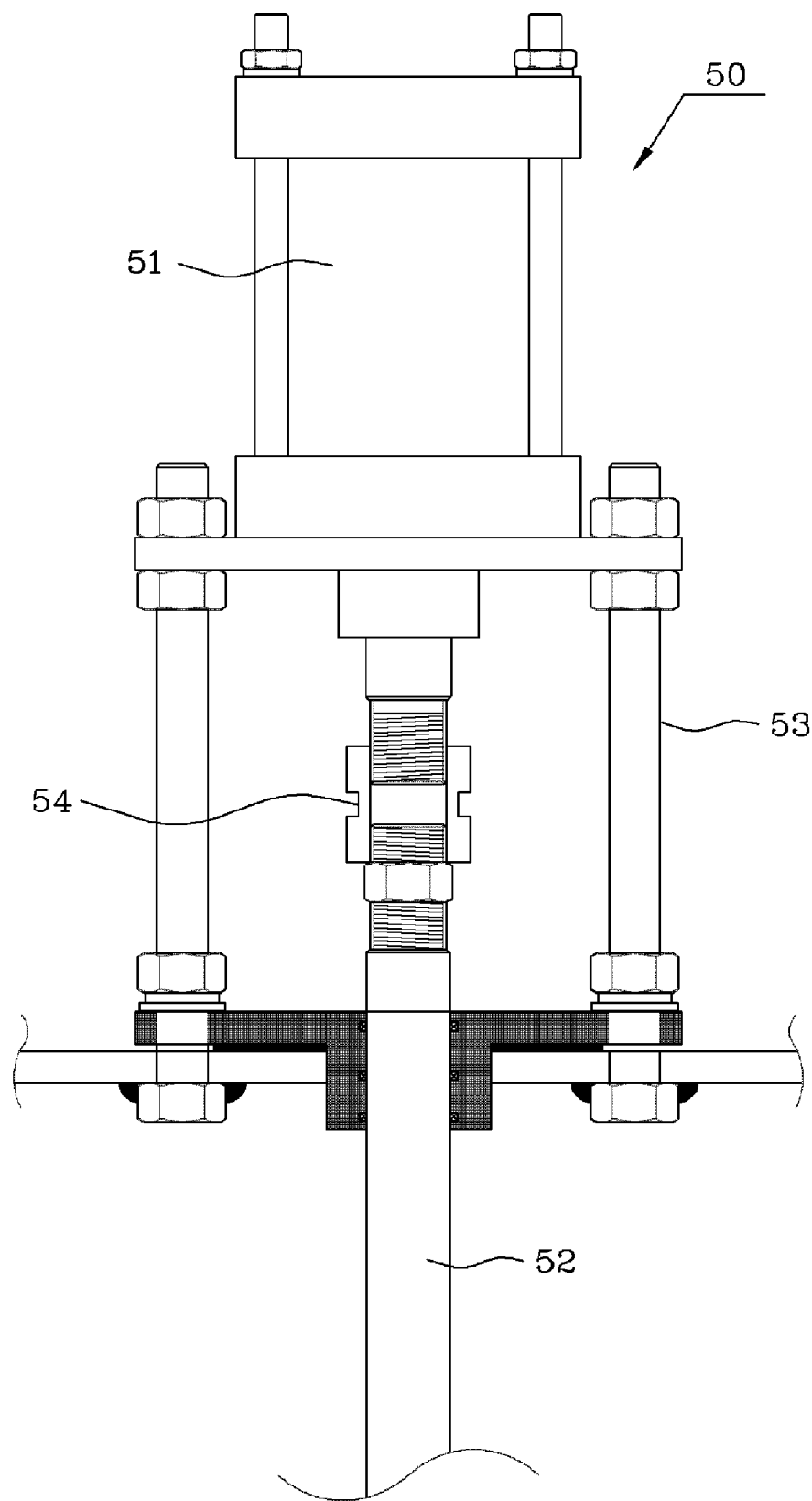
[Fig. 2]

[Fig. 3]
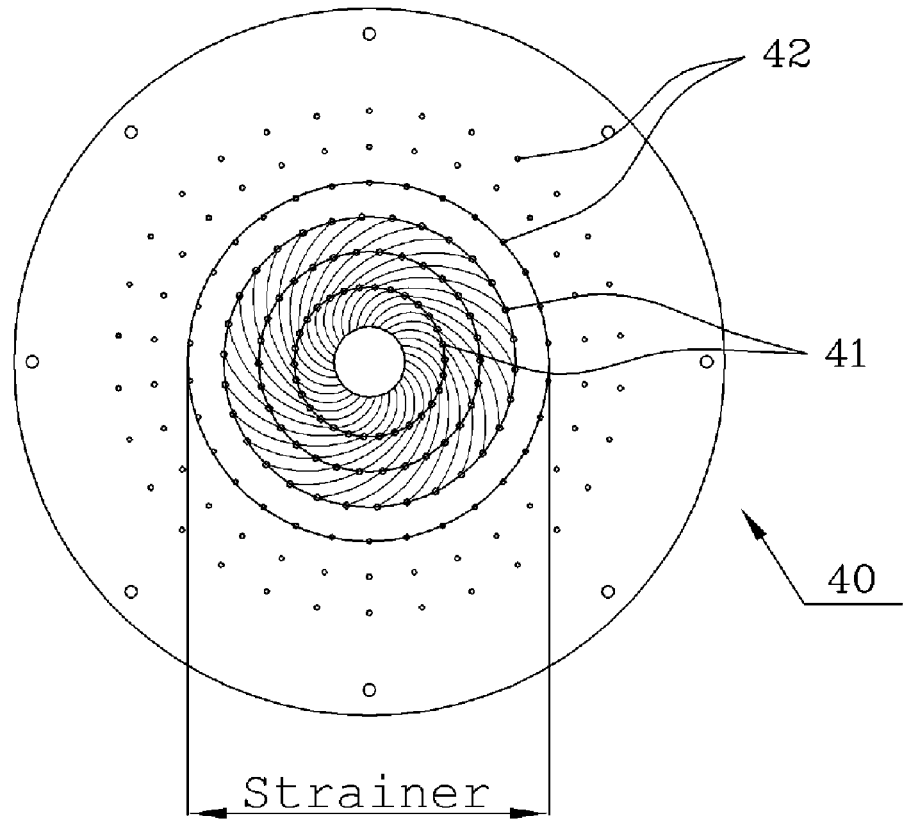
[Fig. 4]
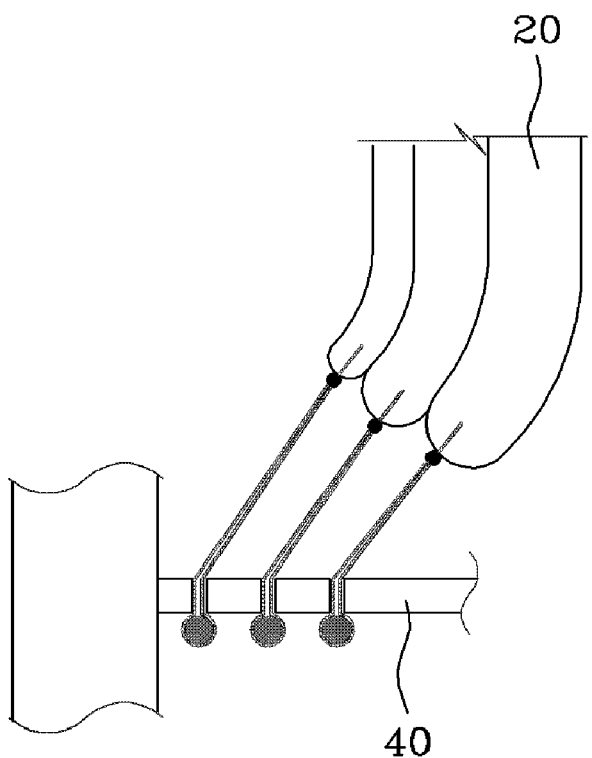

LIFT TYPE PORE-CONTROLLABLE FIBER FILTER

TECHNICAL FIELD

The present invention relates, in general, to a lift type pore-controllable fiber filter, in which a force is uniformly distributed throughout a fiber filter material, thereby improving filtration performance.

BACKGROUND ART

In general, filters are devices that filter contaminated raw water to generate drained clean water, and are gradually being made large in order to filter the waters of a wide river, industrial wastewater effluent, and so on.

Among these filters, the representative filter is a pore controllable fiber (PCF) filter. The PCF filter employs fiber yarns such as filament yarns that are bundled up and disposed on a path of flowing water, as a filter material. This filter material is called a fiber filter material. When the fiber filter material is used, pores formed by filament yarns can be easily adjusted under physical control, so that the PCF filter has good filtration performance, and is easily cleaned to guarantee a long effective lifetime.

In particular, the PCF filter has turned out to have an excellent effect on removal efficiency depending on particulate size, removal efficiency of suspended solids, and so on, as compared to other filters.

The PCF filter has the fiber filter material twisted around a porous tube, thereby forming fine pores.

Here, in the case in which the fiber filter material is short, twist tension is uniformly transmitted to the fiber, so that filtration layers of all the upper, middle and lower parts of the fiber are densely formed to make the quality of filtered water good. In contrast, in the case in which the fiber filter material is long, twist tension is not uniformly transmitted to all of the upper, middle and lower parts of the fiber, so that the tension of the middle part becomes weak, and thus the filtration layers are loosely formed causing the filtration performance to deteriorate.

DISCLOSURE

Technical Problem

Accordingly, the present invention has been made in an effort to solve the problems occurring in the related art, and an embodiment of the present invention provides a lift type pore-controllable fiber filter, in which a force is uniformly distributed to respective parts of a fiber filter material.

Technical Solution

In order to achieve the above object, according to an aspect of the present invention, there is provided a lift type pore-controllable fiber filter, which comprises: a filter tank communicating with a raw water inflow pipe and a back-washing water drain pipe on an upper side thereof and an air inflow pipe on a lower side thereof; a strainer coaxially formed as a porous tub in the filter tank, extending to an outside of the filter tank at a bottom thereof to communicate with a treated water drain pipe, and having a piston guide recessed in an axial direction at an upper portion thereof; a lifting driver including a cylinder above the filter tank, and a piston driven by the cylinder and extending from the cylinder to the piston guide in the filter tank so as to reciprocate; an upper filter material fixing plate having fixing means disposed within a radius smaller than that of the strainer, fixed to the piston above the strainer, and working in collaboration with reciprocation of the piston; a lower filter material fixing plate having fixing means disposed within a radius smaller than that of the strainer, and fixed below the strainer; and a fiber filter material fixed to the fixing means of the upper and lower filter material fixing plates at upper and lower ends thereof respectively, and forming filtering pore layers on an outer circumference of the strainer.

According to an embodiment of the present invention, at least one of the upper and lower filter material fixing plates may be spiral branches extending radially, on which the fixing means capable of fixing the upper or lower end of the fiber filter material are formed.

According to another embodiment of the present invention, at least one of the upper and lower filter material fixing plates may be a circular plate on which the fixing means capable of fixing the upper or lower end of the fiber filter material are formed, wherein the fixing means are through-holes arranged spirally and radially.

According to another embodiment of the present invention, the filter tank may include an air distribution plate below the lower filter material fixing plate so as to distribute air, which flows through the air inflow pipe, to the fiber filter material.

According to another embodiment of the present invention, the cylinder may be a rotary cylinder endowing the piston with reciprocating and twisting motions.

According to another embodiment of the present invention, the piston may include a length adjusting means.

According to another embodiment of the present invention, the length adjusting means may divide the piston into two rods in series, form threads having different directions on respective ends of the two rods, connect a nut with the ends of the two rods, and adjusts a length of the piston by rotating the nut.

According to another embodiment of the present invention, the length adjusting means may divide the piston into two rods in series, form male and female threads on respective ends of the two rods, connect the ends of the two rods, and adjust a length of the piston.

According to another embodiment of the present invention, the filter tank may further include supports fixing the cylinder. Each support may have threads at one or both ends thereof to adjust a height thereof by adjusting a height at which a nut is fastened.

ADVANTAGEOUS EFFECTS

According to embodiments of the present invention, the lift type PCF filter pulls up the fiber filter material, and presses fiber filter material toward the strainer. As a result, although the fiber filter material is long, force is uniformly distributed throughout the fiber filter material, thereby improving filtration performance.

DESCRIPTION OF DRAWINGS

FIG. 1 is a sectional view illustrating a lift type pore-controllable fiber (PCF) filter according to an embodiment of the present invention;

FIG. 2 is a sectional view illustrating a lifting driver in a lift type PCF filter according to an embodiment of the present invention;

FIG. 3 is a top plan view illustrating a lower filter material fixing plate in a lift type PCF filter according to an embodiment of the present invention; and FIG. 4 is an assembled sectional view illustrating a lower filter material fixing plate in a lift type PCF filter according to an embodiment of the present invention.

DESCRIPTION OF SYMBOLS OF THE MAIN PARTS IN THE DRAWINGS

| | |
|---|---|
| 10: | filter tank |
| 20: | fiber filter material |
| 30: | strainer |
| 40: | lower filter material fixing plate |
| 50: | lifting driver |
| 51: | cylinder |
| 52: | piston |
| 53: | support |
| 54: | length adjusting means |
| 60: | upper filter material fixing plate |
| 100: | back-washing water main drain pipe |
| 110: | back-washing water drain pipe |
| 120: | back-washing water drain valve |
| 200: | raw water main pipe |
| 210: | raw water inflow pipe |
| 220: | raw water valve |
| 300: | treated water main drain pipe |
| 310: | drain pipe |
| 400: | back-washing air main pipe |
| 410: | air inflow pipe |
| 420: | air supply valve |

BEST MODE

Now, exemplary embodiments of the present invention will be described in detail with reference to the accompanying drawings. In the following description of the present invention, a detailed description of known functions and configurations incorporated herein will be omitted when it may make the subject matter of the present invention rather unclear.

Further, technical terms, as will be mentioned hereinafter, are terms defined in consideration of their function in the present invention, which may vary according to the intentions of user, so that the technical terms should be defined as based on the contents of this specification.

FIG. 1 is a sectional view illustrating a lift type pore-controllable fiber (PCF) filter according to an embodiment of the present invention. FIG. 2 is a sectional view illustrating a lifting driver in a lift type PCF filter according to an embodiment of the present invention. FIG. 3 is a top plan view illustrating a lower filter material fixing plate in a lift type PCF filter according to an embodiment of the present invention. FIG. 4 is an assembled sectional view illustrating a lower filter material fixing plate in a lift type PCF filter according to an embodiment of the present invention.

As illustrated in FIG. 1, the lift type PCF filter according to present invention includes a filter tank 10, a strainer 30, a lifting driver 50 having a cylinder 51 and a piston 52, an upper filter material fixing plate 60, a lower filter material fixing plate 40, and a fiber filter material 20.

As illustrated in FIG. 1, the filter tank 10 is connected with a raw water inflow pipe 210 and a back-washing water drain pipe 110 on an upper side thereof, wherein the raw water inflow pipe 210 is equipped with a raw water valve 220 controlling inflow of raw water, and the back-washing water drain pipe 110 is equipped with a back-washing water drain valve 120 controlling a discharge of back-washing water. The filter tank can have various shapes, and most preferably a cylindrical shape.

It does not matter if the raw water inflow pipe 210 and the back-washing water drain pipe 110 are independently connected in parallel to the upper side of the filter tank 10, or are connected so as to have one path using a T-shaped pipe fitting joint as illustrated in FIG. 1. However, in the latter case, the raw water inflow pipe 210 and the back-washing water drain pipe 110 must have respective external paths that are independently controlled by the raw water valve 220 and the back-washing water drain valve 120.

In detail, the raw water inflow pipe 210 and the back-washing water drain pipe 110 are disposed together on the upper side of the filter tank 10, but their paths are selected by actuation of the raw water valve 220 and the back-washing water drain valve 120, respectively.

The filter tank 10 is connected with an air inflow pipe 410 on a lower side thereof. The air inflow pipe 410 is also controlled by actuation of an air supply valve 420.

The filter tank 10 and the strainer 30 define a dual space of a coaxial cylinder. The strainer 30 is a cylinder, in an outer wall of which many holes are densely formed.

That is, the strainer 30 is a porous cylinder disposed in the filter tank on the same axis as the filter tank. The strainer 30 is connected with a treated water drain pipe 310 extending outwards from the filter tank at the bottom thereof, and has a piston guide 31 recessed in an axial direction at an upper portion thereof.

After flowing into the cylindrical filter tank 10, the raw water to be filtered enters the strainer 30 through the holes formed in the cylindrical outer circumference of the strainer 30, and is drained through the treated water drain pipe 310 connected to the bottom of the strainer 30.

As illustrated in FIG. 1, the piston guide 31 functions as a guide path of a piston 52, which will be described below, and serves as means for supporting the top of the strainer 30 by means of the piston 52.

Thus, the piston guide 31 is preferably formed at such a depth that the piston 52 is guided with a relative long stroke.

The lifting driver 50 is a machine that drives the piston 52 reciprocating along the piston guide 31.

As illustrated in FIG. 2, the lifting driver 50 is composed of the cylinder 51 and the piston 52. The cylinder 51 is fixed to the upper side of the filter tank 10 by supports 53.

The cylinder 51 can be selected between a cylinder for simple linear reciprocation and a rotary cylinder for combination of linear reciprocation and rotation of the piston 52.

Meanwhile, the piston 52 is equipped with a length adjusting means 54. As illustrated in FIG. 2, the length adjusting means 54 can be variously implemented, for instance, by dividing the piston 52 into two rods in series, forming male and female threads on respective ends of the two rods, connecting the ends of the two rods, and adjusting a length of the piston, or by dividing the piston 52 into two rods in series, forming threads having different directions (e.g. left-hand threads for the upper rod, and right-hand threads for the lower rod) on respective ends of the two rods, connecting a nut 54 with the ends of the two rods, and adjusting a length of the piston by rotating the nut 54.

Another example of the length adjusting means may be configured so that the supports 53 are threaded to adjust their heights.

In this manner, in the case in which the length adjusting means 54 is disposed outside the filter tank 10, the length of the piston can be easily adjusted without disassembling the filter tank 10 when it is necessary to adjust the length of the piston.

The upper filter material fixing plate 60 is installed in the filter tank 10, is fixed to the piston 52 on the upper side of the strainer 30, and works in collaboration with the reciprocation of the piston 52. The lower filter fixing plate 40 is fixed to the lower side of the strainer 30 in the filter tank 10.

As illustrated in FIG. 4, the upper and lower filter material fixing plates 60 and 40 are fixedly connected with respective upper and lower ends of the fiber filter material 20. Thus, when the lifting driver is actuated to pull the upper filter material fixing plate 60, the fiber filter material forms filtration pores around the outer circumference of the strainer 30.

Meanwhile, in order to fix the fiber filter material 20, the lower and upper filter material fixing plates 40 and 60 are provided with spiral radial fixing means 41 and 61 respectively, as illustrated in FIG. 1. In this embodiment, positions of the fixing means 41 and 61 have important technical meanings.

As illustrated in FIG. 3 (which illustrates the lower filter material fixing plate 40; however, the identical principle is applied to the upper filter material fixing plate, and thus the following description will be made with reference to FIG. 3), the fixing means 41 and 61 are formed around the centers of the upper and lower filter material fixing plates within a radius smaller than that of the strainer 30. This is for fixing the fiber filter material 20 pressed toward the central axis of the strainer 30.

In detail, the fixing means 41 and 61 are formed within a diameter smaller than that of the strainer 30, so that the fixed fiber filter material has an orientation in which it is pressed toward the strainer 30. When the piston 52 is actuated to pull the fiber filter material 20, the fixing means 41 and 61 cause the entire fiber filter material 20 to be pressed toward the strainer to thereby form the filtration layers.

As illustrated in FIG. 4, the fiber filter material 20 is preferably fixed in such a manner that it overlaps to form multiple layers.

Thus, the upper filter material fixing plate 60 or the lower filter material fixing plate 40 requires means for fixing the upper or lower end of the fiber filter material 20 such that the fiber filter material 20 can uniformly cover the outer circumference of the strainer 30. To this end, the upper filter material fixing plate 60 or the lower filter material fixing plate 40 can be formed of spiral radial branches on which the fixing means capable of fixing the upper or lower end of each fiber filter material 20 are formed, or can be a circular plate on which through-holes arranged around the center thereof are formed as the fixing means capable of fixing the upper or lower end of each fiber filter material 20, as illustrated in FIG. 3.

In FIG. 3, the lower filter material fixing plate employs a wide circular plate in which air vent holes 42, through which air and water pass, are formed around the fixing means 41. This configuration is merely one of the embodiments of the present invention. For example, the lower filter material fixing plate may employ a circular plate, which has a diameter smaller than that of the strainer and is formed with the fixing means 41 alone.

Meanwhile, as illustrated in FIG. 1, an air distributing plate 12 is disposed below the lower filter material fixing plate 40. The air distributing plate 12 distributes air introduced through the air inflow pipe 410 to the fiber filter material 20.

The air distributing plate 12 serves to uniformly distribute the ejected air to the fiber filter material 20. To this end, the air distributing plate 12 can be formed in various shapes, for instance, of a circular plate having a plurality of through-holes or of a plurality of plates.

Now, the operation of the lift type PCF filter will be described below.

First, a filtering process is as follows.

The raw water valve 220 is opened, while the back-washing water drain valve 120 and the air supply valve 420 are closed. Thereby, a filtering path running from the raw water main pipe 200 to the treated water main drain pipe 300 via the raw water inflow pipe 210, raw water valve 220, lift type PCF filter, and treated water drain pipe 310 is formed.

When the raw water valve 220 is opened, raw water flows into the filter tank 10 of the lift type PCF filter. The raw water flowing into the filter tank 10 flows through the fiber filter material 20, and then flows into the strainer 30 past the holes of the strainer 30. At this time, the raw water is filtered to become treated water. The treated water drains to the treated water main drain pipe 300 through the treated water drain pipe 310 on the bottom of the strainer 30.

At this time, the filtration efficiency of the fiber filter material 20 is dependent on sizes of the pores formed by the fiber filter material 20, and the sizes of the pores are determined by tension of the fiber filter material 20.

In this embodiment, the tension of the fiber filter material 20 is generated by motion of the piston 52 of the lifting driver 50.

In detail, when the piston 52 moves upwards, the upper filter material fixing plate 60 fixed to the piston 52 pulls the fiber filter material 20 to apply tension to the fiber filter material 20. The internal pores of the fiber filter material 20 are contracted by the tension of the fiber filter material 20, thereby forming the filtration pores.

At this time, in the case in which the cylinder 51 of the lifting driver 50 is implemented as a rotary cylinder that causes the piston 52 to simultaneously carry out linear reciprocation and rotation, when the piston 52 is raised, the fiber filter material 20 is pulled while winding the outer circumference of the strainer, thereby forming uniform pores more effectively.

Next, a back-washing process of the lift type PCF filter will be described below.

The raw water valve 220 is closed, while the back-washing water drain valve 120 is opened. Thereby, a back-washing path running from the treated water drain pipe 310 to the back-washing water main drain pipe 100 via the lift type PCF filter and the back-washing water drain pipe 110 is formed.

In the interior of the lift type PCF filter, the water introduced into the strainer 30 through the treated water drain pipe 310 is ejected to the fiber filter material 20 through the holes of the strainer 30, thereby washing the fiber filter material 20. The water washing the fiber filter material 20 is discharged to the outside through the back-washing water drain pipe 110.

When the back washing is performed, the piston 52 of the lifting driver 50 is lowered to remove the tension from the fiber filter material 20. Thereby, the fiber filter material 20 is easily shaken or vibrated, rubbed, and washed by the flowing water ejected from the strainer 30.

In order to greatly improve back-washing efficiency, the air is ejected upwards below the fiber filter material 20 through the air inflow pipe 410 when the back washing is performed. At this time, in order to uniformly distribute the air to the fiber filter material 20, the air distribution plate 12 is installed on the lower part of the filter tank 10.

Meanwhile, the tensile strength of the fiber filter material 20 deteriorates as a result of its being used, and thus the filament yarns of the fiber filter material become loosened. Thus, although the fiber filter material 20 is pulled by the piston, it does not obtain the desired pore size.

In this case, in this embodiment, the length of the piston is minutely adjusted by the length adjusting means 54. Thereby, the fiber filter material can always form the pores with optimal tension.

Thus, according to the embodiment, the fiber filter material receives uniform tension and is pressed toward the strainer by the linear pulling motion and/or rotational motion of the cylinder. When the fiber filter material loosens and loses tensile strength due to long-term use and the resulting accumulation of fatigue, the length of the fiber filter material is adjusted again by the length adjusting means, so that the lifetime of the lift type PCF filter is prolonged.

Of course, each valve, the stroke of the piston, etc. can be controlled by electrical control signals of automatic control equipment.

As described above, the fixing means of the upper and lower filter material fixing plates are disposed inside an area defined by the outer circumference of the strainer, so that, when the fiber filter material is pulled above, the fiber filter material is tensioned toward a centripetal axis of the strainer and thus forms a strong compressive force. Unlike when the fiber filter material is twisted in a conventional twist type PCF filter, the loss of force due to friction does not occur. Thus, the same force is applied to generate greater compressive force, so that the pores of the filtering layers are uniformly formed to improve the filtration performance.

Further, when it is necessary to further increase the compressive force, it can be accomplished by pulling and twisting the fiber filter material in turns or at the same time.

In the drawings and specification, typical exemplary embodiments of the invention have been disclosed, and although specific terms are employed, they are used in a generic and descriptive sense only and are not intended to have been used for the purposes of imposing limitations, so that the scope of the invention is set forth in the following claims.

The invention claimed is:

1. A lift type pore-controllable fiber filter, comprising:
   a cylinder type filter tank communicating with a raw water inflow pipe and a back-washing water drain pipe on an upper side thereof and an air inflow pipe on a lower side thereof;
   a strainer coaxially formed as a porous tub in the filter tank, extending to an outside of the filter tank at a bottom thereof to communicate with a treated water drain pipe, and having a piston guide recessed in an axial direction at an upper portion thereof;
   a lifting driver including a cylinder fixed above the filter tank by supports, and a piston driven by the cylinder and extending from the cylinder to the piston guide in the filter tank so as to reciprocate;
   an upper filter material fixing plate having spiral fixing means disposed within a radius smaller than that of the strainer in a central direction, fixed to the piston within the filter tank, and working in collaboration with reciprocation of the piston above the strainer;
   a lower filter material fixing plate having spiral fixing means disposed within a radius smaller than that of the strainer in a central direction, and fixed below the strainer within the filter tank; and
   a fiber filter material fixed to the fixing means of the upper and lower filter material fixing plates at upper and lower ends thereof respectively, and forming filtering pore layers on an outer circumference of the strainer.

2. The lift type pore-controllable fiber filter as set forth in claim 1, wherein at least one of the upper and lower filter material fixing plates is spiral branches extending radially, on which the fixing means capable of fixing the upper or lower end of the fiber filter material are formed.

3. The lift type pore-controllable fiber filter as set forth in claim 1, wherein at least one of the upper and lower filter material fixing plates is a circular plate, wherein the fixing means are through-holes arranged spirally and radially.

4. The lift type pore-controllable fiber filter as set forth in claim 1, wherein an air distribution plate is formed below the lower filter material fixing plate so as to distribute air, which flows through the air inflow pipe, to the fiber filter material.

5. The lift type pore-controllable fiber filter as set forth in claim 1, wherein the cylinder is a rotary cylinder endowing the piston with twisting motions.

6. The lift type pore-controllable fiber filter as set forth in claim 1, wherein the piston includes a length adjusting means above the filter tank.

7. The lift type pore-controllable fiber filter as set forth in claim 6, wherein the length adjusting means divides the piston into two rods in series, forms threads having different directions on respective ends of the two rods, connects a nut with the ends of the two rods, and adjusts a length of the piston by rotating the nut.

8. The lift type pore-controllable fiber filter as set forth in claim 6, wherein the length adjusting means forms threads at one or both ends of the supports to adjust a height of the supports.

* * * * *